(12) United States Patent
Feng

(10) Patent No.: US 10,574,335 B2
(45) Date of Patent: Feb. 25, 2020

(54) METHOD AND DEVICE FOR RELAY TRANSMISSION, AND RELAY TERMINAL APPARATUS

(71) Applicant: GUANGDONG OPPO MOBILE TELECOMMUNICATIONS CORP., LTD., Dongguan, Guangdong (CN)

(72) Inventor: Bin Feng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/067,723

(22) PCT Filed: Mar. 30, 2016

(86) PCT No.: PCT/CN2016/077919
§ 371 (c)(1),
(2) Date: Jul. 2, 2018

(87) PCT Pub. No.: WO2017/166142
PCT Pub. Date: Oct. 5, 2017

(65) Prior Publication Data
US 2019/0028177 A1   Jan. 24, 2019

(51) Int. Cl.
*H04B 7/14* (2006.01)
*H04W 76/27* (2018.01)
(Continued)

(52) U.S. Cl.
CPC .......... *H04B 7/14* (2013.01); *H04L 41/0813* (2013.01); *H04W 8/005* (2013.01);
(Continued)

(58) Field of Classification Search
CPC ........ H04B 7/14; H04W 76/27; H04W 8/005; H04W 72/04; H04W 72/0413; H04W 80/02; H04L 41/0813
See application file for complete search history.

(56) References Cited

U.S. PATENT DOCUMENTS 9,107,202 B2   8/2015   Doppler
9,491,766 B2   11/2016  Peng
(Continued)

FOREIGN PATENT DOCUMENTS

CN   102090132 A   6/2011
CN   102318431 A   1/2012
(Continued)

OTHER PUBLICATIONS

English Translation of the Written Opinion of the International Search Authority in international application No. PCT/CN2016/077919, dated Jan. 4, 2017.
(Continued)

*Primary Examiner* — Ian N Moore
*Assistant Examiner* — Latresa A McCallum
(74) *Attorney, Agent, or Firm* — Ladas & Parry, LLP

(57) ABSTRACT

Disclosed in the present invention are a method and device for relay transmission, and relay terminal apparatus, used to lower processing complexity of relay transmission. The method comprises: a relay terminal apparatus sends to a core network apparatus a bearer establishment request used to request for establishing an EPS bearer for a remote terminal apparatus; and the relay terminal apparatus receives a reconfiguration message sent by an access network apparatus, the reconfiguration message carrying configuration information of the EPS bearer established for the remote terminal apparatus, wherein the EPS bearer comprises a cellular data transmission channel between the access network apparatus
(Continued)

and the relay terminal apparatus, and a D2D data transmission channel between the relay terminal apparatus and the remote terminal apparatus.

19 Claims, 5 Drawing Sheets

(51) Int. Cl.
*H04L 12/24* (2006.01)
*H04W 8/00* (2009.01)
*H04W 72/04* (2009.01)
*H04W 80/02* (2009.01)

(52) U.S. Cl.
CPC ....... *H04W 72/0413* (2013.01); *H04W 76/27* (2018.02); *H04W 80/02* (2013.01)

(56) References Cited

U.S. PATENT DOCUMENTS

| 2011/0106952 | A1  | 5/2011  | Doppler |          |
|--------------|-----|---------|---------|----------|
| 2013/0273926 | A1  | 10/2013 | Peng    |          |
| 2016/0100303 | A1* | 4/2016  | Kim     | H04W 4/023 455/426.1 |
| 2017/0142761 | A1  | 5/2017  | Zhang   |          |
| 2018/0343692 | A1* | 11/2018 | Lee     | H04W 76/14 |

FOREIGN PATENT DOCUMENTS

| CN | 102759784 A   | 10/2012 |
| CN | 103238360 A   | 8/2013  |
| EP | 3163966 A1    | 5/2017  |
| WO | 2015115847 A1 | 8/2015  |
| WO | 2015147617 A1 | 10/2015 |
| WO | 2016015296 A1 | 2/2016  |
| WO | 2016028204 A1 | 2/2016  |

OTHER PUBLICATIONS

Supplementary European Search Report in European application No. 16895923.7, dated Nov. 14, 2018.
ZTE: "Considerations on the UE-to-Network Relays", 3GPP Draft; R2-151169—Considerations of the Lie-to-Network Relays, 3rd Generation Partnership Project (3GPP), Mobile Competence Centre; 650 Route des Lucioles ; F-06921 Sophia-Antipolis Cedex; Fra vol. RAN WG2, No. Bratislava, Slovakia; Apr. 20, 2015-Apr. 24, 2015 Apr. 19, 2015 (Apr. 19, 2015), XP050936143, Retrieved from the Internet: URL:http://www.3gpp.org/ftp/Meetings 3GPPSYNC/ RAN2/Docs/—[retrieved on Apr. 19, 2015].
ZTE: "On connection establishment over PC5", 3GFP Draft; R2-152548—On Connection Establishment Over PC5, 3rd Generation Partnership Project (3GPP), Mobile Competence Centre ; 650, Route Des Lucioles ; F-06921 Sophia-Antipolis Cedex; France vol. RAN WG2, No. Fukuoka, Japan; May 25, 2015-May 29, 2015 May 24, 2015 (May 24, 2015), XP050973322, Retrieved from the Internet: URL:http://www.3gpp.org/ftp/Meetings 3GPP SYNC/ RAN2/Docs/—[retrieved on May 24, 2015].
International Preliminary Report on Patentability with English translation in international application No. PCT/CN2016/077919, dated Oct. 2, 2018.
International Search Report in international application No. PCT/CN2016/077919, dated Jan. 4, 2017.
The Written Opinion of the International Search Authority in international application No. PCT/CN2016/077919, dated Jan. 4, 2017.

\* cited by examiner

METHOD AND DEVICE FOR RELAY TRANSMISSION, AND RELAY TERMINAL APPARATUS

RELATED APPLICATION

This application is an application under 35 U.S.C. 371 of International Application No. PCT/CN2016/077919 filed on Mar. 30, 2016, the entire contents of which are incorporated herein by reference.

TECHNICAL FIELD

Embodiments of the disclosure relate to the field of communications, and more specifically, to a method and an apparatus for relay transmission and a relay terminal device.

BACKGROUND

A Device-to-Device (D2D) technology enables neighboring terminal devices to transmit data by direct links within a close range, instead of forwarding data via an access network equipment. D2D communication and a cellular system may share licensed band resources to form a unified hybrid cellular-D2D network. In this hybrid network, a part of terminal devices can still work in a cellular communication mode, that is, communicate with other terminal devices through an access network equipment, and a part of terminal devices can work in a D2D communication mode, that is, directly transmit data with other terminal devices through direct links between the terminal devices and the other terminal devices.

Moreover, a D2D relay can be used to assist data transmission between an access network equipment and a terminal device. In this case, the D2D relay and the D2D terminal adopt a D2D communication mode, and the D2D relay and the access network equipment adopt a cellular communication mode. The D2D relay receives and forwards data in a half-duplex mode, and changes its mode during the receiving and forwarding process.

In the related technology, an Evolved Packet System (EPS) bearer is set up between a D2D relay and a cellular network, and a D2D terminal is invisible to the cellular network. In this case, the D2D relay needs to perform Internet Protocol (IP) Network (NET) traversal when relaying data transmitted between the D2D terminal and the cellular network, and the process is rather complex.

SUMMARY

Embodiments of the disclosure provide a method and apparatus for relay transmission and a relay terminal device, which can reduce the processing complexity of relay transmission.

In a first aspect, a method for relay transmission is provided, which includes: transmitting, by a relay terminal device, a bearer setup request to a core network equipment, the bearer setup request being configured to request the setup of an Evolved Packet System (EPS) bearer for a remote terminal device; and receiving, by the relay terminal device, a reconfiguration message sent by an access network equipment, the reconfiguration message carrying configuration information of the EPS bearer set up for the remote terminal device, where the EPS bearer includes a cellular data transmission channel between the access network equipment and the relay terminal device and a Device-to-Device (D2D) data transmission channel between the relay terminal device and the remote terminal device.

According to the method for relay transmission provided by the embodiment of the disclosure, the relay terminal device transmits a bearer setup request to the core network equipment, the bearer setup request being configured to request the setup of an EPS bearer for the remote terminal device; and the core network equipment and the access network equipment set up an EPS bearer for the remote terminal device according to the bearer setup request, where the EPS bearer includes a cellular data transmission channel between the access network equipment and the relay terminal device and a D2D data transmission channel between the relay terminal device and the remote terminal device. Therefore, the relay terminal device can adopt the EPS bearer to relay data transmitted between the remote terminal device and the access network equipment, such that the relay terminal device can relay in different manners and does not need to perform NET traversal, thus reducing the data processing complexity of relay transmission.

Optionally, the bearer setup request carries a terminal device identifier of the remote terminal device.

In a first possible implementation of the first aspect, the configuration information of the EPS bearer includes configuration information of a cellular communication interface between the relay terminal device and the access network equipment and configuration information of a D2D communication interface between the relay terminal device and the remote terminal device. The configuration information of the cellular communication interface is specifically first configuration information of a physical layer, and the configuration information of the D2D communication interface is specifically second configuration information of the physical layer; or, the configuration information of the cellular communication interface is specifically first configuration information of a physical layer and first configuration information of a Layer 2, and the configuration information of the D2D communication interface is specifically at least one of second configuration information of the physical layer or second configuration information of the Layer 2.

Optionally, the configuration information of the cellular communication interface between the relay terminal device and the access network equipment may be specifically configuration information of a user-plane peer layer between the access network equipment and the relay terminal device, and the configuration information of the D2D communication interface between the relay terminal device and the remote terminal device may be specifically configuration information of a user-plane peer layer between the relay terminal device and the remote terminal device.

In view of the above possible implementation, in a second possible implementation of the first aspect, the first configuration information of the physical layer includes at least one of: information of a first transmission resource for relay transmission on the cellular communication interface, a relay-specific Radio Network Temporary Identity (RNTI), a correspondence between a data volume interval for relay transmission and a Physical Uplink Control Channel (PUCCH) resource, or a correspondence between the data volume interval for relay transmission and a preamble, where the relay-specific RNTI is used by the access network equipment to scramble a Physical Downlink Control Channel (PDCCH) for scheduling downlink data transmission of the remote terminal device; and the second configuration information of the physical layer includes: information of a second transmission resource for relay transmission on the D2D communication interface.

In view of the above possible implementations, in a third possible implementation of the first aspect, the first configuration information of the Layer 2 includes at least one of: a relay-specific Logical Channel Identifier (LCID) and a Layer-2 identifier allocated to the remote terminal device, the relay-specific LCID being used for identifying relay transmission; and/or the second configuration information of the Layer 2 includes: the Layer-2 identifier allocated to the remote terminal device.

In view of the above possible implementations, in a fourth possible implementation of the first aspect, the configuration information of the EPS bearer further includes configuration information of a user-plane peer layer between the access network equipment and the remote terminal device. The method may further include: transmitting, to the remote terminal device, the configuration information of the user-plane peer layer between the access network equipment and the remote terminal device.

In view of the above possible implementations, in a fifth possible implementation of the first aspect, before the transmitting, by a relay terminal device, a bearer setup request to a core network equipment, the method may further include: receiving, by the relay terminal device, a connection setup request from the remote terminal device, the connection setup request being configured to request the setup of a D2D communication link between the relay terminal device and the remote terminal device. The transmitting, by a relay terminal device, a bearer setup request to a core network equipment includes: transmitting, by the relay terminal device, a bearer setup request to the core network equipment according to the connection setup request.

In view of the above possible implementations, in a sixth possible implementation of the first aspect, the transmitting, by a relay terminal device, a bearer setup request to a core network equipment includes: transmitting, by the relay terminal device, a Non Access Stratum (NAS) message to the core network equipment, the NAS message responding to the bearer setup request.

In view of the above possible implementations, in a seventh possible implementation of the first aspect, the bearer setup request carries the terminal device identifier of the remote terminal device; and the EPS bearer is set up by the core network equipment in a manner of transmitting application layer protocol signaling to the access network equipment, the application layer protocol signaling carrying the terminal device identifier of the remote terminal device.

Optionally, the core network equipment may be a Mobility Management Entity (MME), and in this case, the MME may transmit the application layer protocol signaling to the access network equipment through an S1 interface between the MME and the access network equipment.

In view of the above possible implementations, in an eighth possible implementation of the first aspect, the transmitting, by a relay terminal device, a bearer setup request to a core network equipment includes: transmitting, by the relay terminal device, a Radio Resource Control (RRC) message to the access network equipment, the RRC message carrying the bearer setup request, such that the access network equipment transmits, to the core network equipment according to the RRC message, application layer protocol signaling for requesting the setup of a bearer for the remote terminal device.

Optionally, the application layer protocol signaling sent by the access network equipment to the core network equipment may carry the bearer setup request, such that the core network equipment sets up an EPS bearer for the remote terminal device according to identification information of the remote terminal device carried in the bearer setup request.

In view of the above possible implementations, in a ninth possible implementation of the first aspect, the bearer setup request is further configured to request the setup of a Packet Data Network (PDN) connection for the remote terminal device; and the reconfiguration message further carries configuration information of the PDN connection set up for the remote terminal device. The method may further include: transmitting, by the relay terminal device, the configuration information of the PDN connection to the remote terminal device.

In a second aspect, another method for relay transmission is provided, which includes: receiving, by a core network equipment, a bearer setup request sent by a relay terminal device, the bearer setup request being configured to request the setup of an EPS bearer for a remote terminal device; and setting up, by the core network equipment, an EPS bearer for the remote terminal device according to the bearer setup request, where the EPS bearer includes a cellular data transmission channel between the access network equipment and the relay terminal device and a D2D data transmission channel between the relay terminal device and the remote terminal device.

In a first possible implementation of the second aspect, the bearer setup request carries a terminal device identifier of the remote terminal device.

In view of the above possible implementation, in a second possible implementation of the second aspect, the receiving, by a core network equipment, a bearer setup request sent by a relay terminal device includes: receiving, by the core network equipment, a NAS message sent by the relay terminal device, the NAS message responding to the bearer setup request; and the setting up, by the core network equipment, an EPS bearer for the remote terminal device according to the bearer setup request includes: transmitting, by the core network equipment, application layer protocol signaling to the access network equipment, the application layer protocol signaling carrying the terminal device identifier of the remote terminal device.

Optionally, the application layer protocol signaling carries the bearer setup request.

In view of the above possible implementations, in a third possible implementation of the second aspect, the receiving, by a core network equipment, a bearer setup request sent by a relay terminal device includes: receiving, by the core network equipment, application layer protocol signaling sent by the access network equipment, where the application layer protocol signaling is sent by the access network equipment according to an RRC message sent by the relay terminal device, and the RRC message carries the bearer setup request.

In a third aspect, another method for relay transmission is provided, which includes: receiving, by an access network equipment, a bearer setup request for requesting the setup of an EPS bearer for a remote terminal device; setting up, by the access network equipment, an EPS bearer for the remote terminal device according to the bearer setup request, where the EPS bearer includes a cellular data transmission channel between the access network equipment and a relay terminal device and a D2D data transmission channel between the relay terminal device and the remote terminal device; and transmitting, by the access network equipment, a reconfiguration message to the relay terminal device, the reconfiguration message carrying configuration information of the EPS bearer.

Optionally, the bearer setup request carries a terminal device identifier of the remote terminal device.

In a first possible implementation of the third aspect, the configuration information of the EPS bearer includes configuration information of a cellular communication interface between the relay terminal device and the access network equipment and configuration information of a D2D communication interface between the relay terminal device and the remote terminal device. The configuration information of the cellular communication interface is specifically first configuration information of a physical layer, and the configuration information of the D2D communication interface is specifically second configuration information of the physical layer; or, the configuration information of the cellular communication interface is specifically first configuration information of a physical layer and first configuration information of a Layer 2, and the configuration information of the D2D communication interface is specifically at least one of second configuration information of the physical layer and second configuration information of the Layer 2.

In view of the above possible implementations, in a second possible implementation of the third aspect, the first configuration information of the physical layer includes at least one of: information of a first transmission resource for relay transmission on the cellular communication interface, a relay-specific RNTI, a correspondence between a data volume interval for relay transmission and a PUCCH resource, or a correspondence between the data volume interval for relay transmission and a preamble, wherein the relay-specific RNTI is used by the access network equipment to scramble a PDCCH for scheduling downlink data transmission of the remote terminal device; and the second configuration information of the physical layer includes: information of a second transmission resource for relay transmission on the D2D communication interface.

In view of the above possible implementations, in a third possible implementation of the third aspect, the first configuration information of the Layer 2 includes at least one of: a relay-specific LCID or a Layer-2 identifier allocated to the remote terminal device, the relay-specific LCID being used for identifying relay transmission; and/or the second configuration information of the Layer 2 includes: the Layer-2 identifier allocated to the remote terminal device.

In view of the above possible implementations, in a fourth possible implementation of the third aspect, the configuration information of the EPS bearer further includes configuration information of a user-plane peer layer between the access network equipment and the remote terminal device.

In view of the above possible implementations, in a fifth possible implementation of the third aspect, the receiving, by an access network equipment, a bearer setup request includes: receiving, by the access network equipment, an RRC message sent by the relay terminal device, the RRC message carrying the bearer setup request; and the setting up, by the access network equipment, an EPS bearer for the remote terminal device according to the bearer setup request includes: transmitting, by the access network equipment to the core network equipment according to the RRC message, application layer protocol signaling for requesting the setup of a bearer for the remote terminal device.

In view of the above possible implementations, in a sixth possible implementation of the third aspect, the receiving, by an access network equipment, a bearer setup request includes: receiving, by the access network equipment, application layer protocol signaling sent by the core network equipment, the application layer protocol signaling carrying the bearer setup request.

In view of the above possible implementations, in a seventh possible implementation of the third aspect, the bearer setup request is further configured to request the setup of a PDN connection for the remote terminal device. The method may further include: setting up, by the access network equipment, a PDN connection for the remote terminal device according to the bearer setup request; and transmitting, by the access network equipment, configuration information of the PDN connection to the relay terminal device.

In a fourth aspect, an apparatus for relay transmission is provided to perform the method in the first aspect or in any possible implementation of the first aspect. Specifically, the apparatus includes units for performing the method in the first aspect or in any possible implementation of the first aspect.

In a fifth aspect, another apparatus for relay transmission is provided to perform the method in the second aspect or in any possible implementation of the second aspect. Specifically, the apparatus includes units for performing the method in the second aspect or in any possible implementation of the second aspect.

In a sixth aspect, another apparatus for relay transmission is provided to perform the method in the third aspect or in any possible implementation of the third aspect. Specifically, the apparatus includes units for performing the method in the third aspect or in any possible implementation of the third aspect.

In a seventh aspect, another apparatus for relay transmission is provided, which includes: a storage unit and a processor. The storage unit is configured to store instructions. The processor is configured to execute the instructions stored in the storage unit. When executing the instructions stored in the storage device, the processor is enabled to perform the method in the first aspect or in any possible implementation of the first aspect.

In an eighth aspect, another apparatus for relay transmission is provided, which includes: a storage unit and a processor. The storage unit is configured to store instructions. The processor is configured to execute the instructions stored in the storage unit. When executing the instructions stored in the storage device, the processor is enabled to perform the method in the second aspect or in any possible implementation of the second aspect.

In a ninth aspect, another apparatus for relay transmission is provided, which includes: a storage unit and a processor. The storage unit is configured to store instructions. The processor is configured to execute the instructions stored in the storage unit. When executing the instructions stored in the storage device, the processor is enabled to perform the method in the third aspect or in any possible implementation of the third aspect.

In a tenth aspect, a computer readable medium is provided, which is configured to store a computer program. The computer program includes instructions for performing the method in the first aspect or in any possible implementation of the first aspect.

In an eleventh aspect, another computer readable medium is provided, which is configured to store a computer program. The computer program includes instructions for performing the method in the second aspect or in any possible implementation of the second aspect.

In a twelfth aspect, another computer readable medium is provided, which is configured to store a computer program. The computer program includes instructions for performing the method in the third aspect or in any possible implementation of the third aspect.

According to the methods for relay transmission provided by the embodiments of the disclosure, the relay terminal device transmits a bearer setup request through the access network equipment, the bearer setup request being configured to request the setup of an EPS bearer for the remote terminal device; and the access network equipment can set up an EPS bearer for the remote terminal device according to the bearer setup request. The EPS bearer may include a data transmission tunnel between the core network equipment and the access network equipment and a radio bearer between the access network equipment and the relay terminal device. Therefore, the relay terminal device can adopt the EPS bearer to relay data transmitted between the remote terminal device and the core network equipment, such that the relay terminal device does not need to perform NET traversal, thus reducing the data processing complexity of relay transmission.

BRIEF DESCRIPTION OF DRAWINGS

To describe the technical solutions in the embodiments of the disclosure more clearly, the following briefly introduces the accompanying drawings required for describing the embodiments or the prior art. Apparently, the accompanying drawings in the following description show merely some embodiments of the disclosure, and persons of ordinary skill in the art may still derive other drawings from these accompanying drawings without creative efforts.

DETAILED DESCRIPTION

The following clearly and completely describes the technical solutions in the embodiments of the disclosure with reference to the accompanying drawings in the embodiments of the disclosure. Apparently, the described embodiments are merely a part rather than all of the embodiments of the disclosure. All other embodiments obtained by a person of ordinary skill in the art based on the embodiments of the disclosure without creative efforts shall fall within the protection scope of the disclosure.

It should be understood that, the terms "system" and "network" in the text can be exchanged. The term "and/or" in the text merely describes associations between associated objects, and it indicates three types of relationships. For example, A and/or B may indicate that A exists alone, A and B coexist, or B exists alone. In addition, the character "/" in the text generally indicates that the associated objects are in an "or" relationship.

Figure 1:
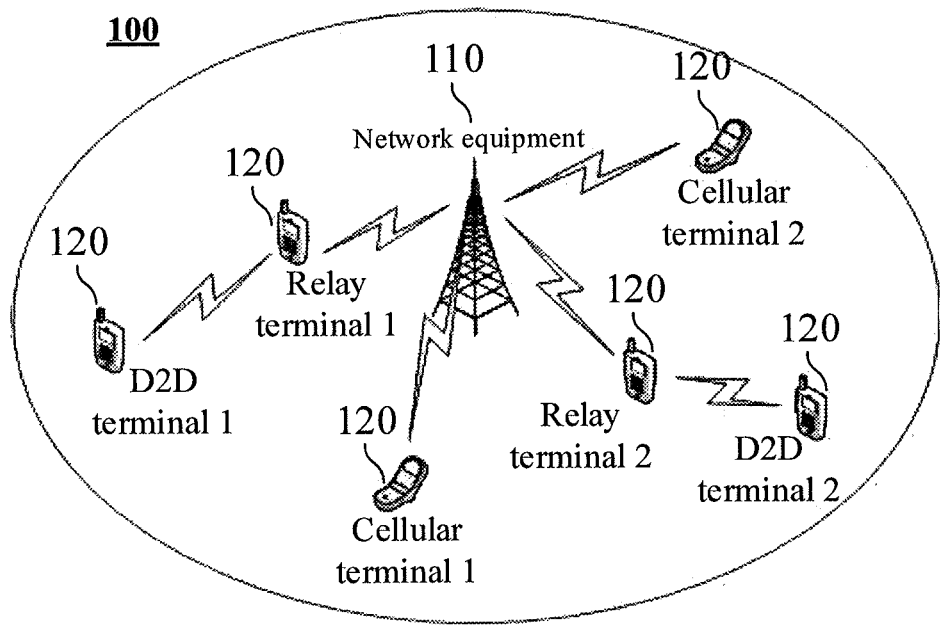
FIG. 1 is a schematic flow chart of a wireless communication system applied in an embodiment of the disclosure.

FIG. 1 is a schematic diagram of a wireless communication system 100 applied in an embodiment of the disclosure. The wireless communication system 100 may include at least one access network equipment 110. The access network equipment 100 may be a device communicating with terminal devices. Each of access network equipment 100 may provide communication coverage for a specific geographical area, and may communicate with terminal devices within the coverage. The access network equipment 100 may be a Base Transceiver Station (BTS) in a GSM system or a Code Division Multiple Access (CDMA) system, or a NodeB (NB) in a WCDMA system, or an Evolutional Node B (eNB or eNodeB) in an LTE system, or a radio controller in a Cloud Radio Access Network (CRAN). Alternatively, the access network equipment may be a relay station, an access point, a vehicle-mounted device, a wearable device, a core network equipment in a future 5G network, an access network equipment in a future evolved Public Land Mobile Network (PLMN), or the like.

The wireless communication system 100 further includes multiple terminal devices 120 within the coverage of the access network equipment 110. The terminal devices 120 may be mobile or fixed. Each of terminal devices 120 may be an access terminal, a User Equipment (UE), a subscriber unit, a subscriber station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or any other processing device connected to a wireless modem, a vehicle-mounted device, a wearable device, a terminal device in a future 5G network, a terminal device in a future evolved PLMN, or the like.

FIG. 1 exemplifies an access network equipment and six terminal devices. Optionally, the wireless communication system 100 may include multiple access network equipments, and each access network equipment may cover other quantities of terminal devices. The embodiment of the disclosure is not limited to this. Moreover, the wireless communication system 100 may also include an MME, a Serving Gateway (S-GW), a Packet Data Network Gateway (P-GW), and other network entities. The embodiment of the disclosure is not limited to this.

Specifically, the terminal devices 120 may communicate in a cellular communication mode or D2D communication mode, where in the cellular communication mode, a terminal device may communicate with other terminal devices through the access network equipment; and in the D2D communication mode, a terminal device may directly communicate with other terminal devices through a D2D link.

The multiple terminal devices 120 shown in FIG. 1 include cellular terminal devices, D2D terminal devices, and relay terminal devices. The cellular terminal device communicates with the access network equipment 110 by using a cellular communication technology. The D2D terminal device transmits data with the access network equipment through the relay terminal device. The relay terminal device and the D2D terminal device are connected via a PC5 interface and communicate by using a D2D communication technology. The D2D communication technology may be specifically a SideLink (SL) technology in LTE, or a WIFI, Bluetooth or any other technology in WLAN, or any other D2D communication technology. The embodiment of the disclosure is not limited to this. The relay terminal device and the access network equipment are connected via a Uu interface and communicate by using a cellular communication technology.

Figure 2:
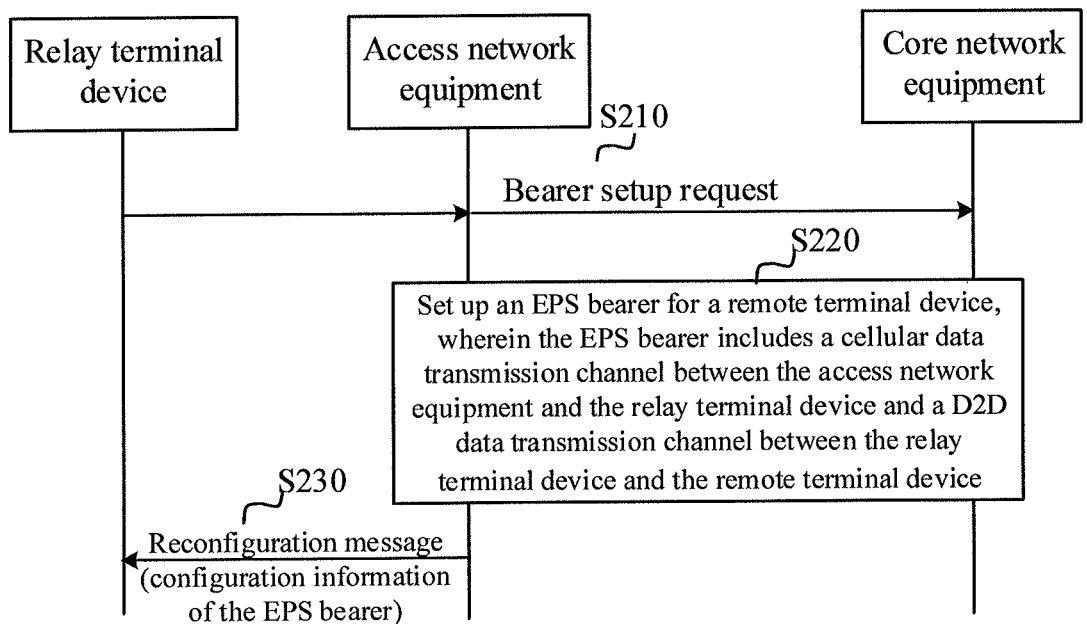
FIG. 2 is a schematic flow chart of a method for relay transmission provided by an embodiment of the disclosure.

FIG. 2 exemplifies a method for relay transmission 200 provided by an embodiment of the disclosure. The method 200 may be applied to the wireless communication system shown in FIG. 1. The embodiment of the disclosure is not limited to this.

At S210, a relay terminal device transmits a bearer setup request to a core network equipment, the bearer setup request being configured to request the setup of an EPS bearer for a remote terminal device.

The bearer setup request is configured to request the setup of an EPS bearer for the remote terminal device. For example, the setup of a default EPS bearer for the remote terminal device or the setup of a dedicated EPS bearer for the remote terminal device is requested. The embodiment of the disclosure is not limited to this.

Optionally, if a PDN connection has not been set up for the remote terminal device, the bearer setup request can be further configured to request the setup of a PDN connection for the remote terminal device. The embodiment of the disclosure is not limited to this.

Optionally, the bearer setup request may carry information of the remote terminal device, for example, a terminal device identifier of the remote terminal device. Optionally, if a PDN connection has been set up for the remote terminal device, the information of the remote terminal device may include an IP address of the remote terminal device. The embodiment of the disclosure is not limited to this.

Optionally, the relay terminal device may transmit the bearer setup request after setting up a D2D communication link (also referred to as a PC5 connection) with the remote terminal device. Optionally, the relay terminal device may also transmit the bearer setup request according to a connection setup request after receiving the connection setup request from the remote terminal device, where the connection setup request is configured to request the setup of a D2D communication link between the relay terminal device and the remote terminal device. For example, the connection setup request may be specifically a direct communication request, for requesting the setup of a PC5 link between the relay terminal device and the remote terminal device. The embodiment of the disclosure is not limited to this.

Optionally, the core network equipment may be specifically an MME or other devices. For ease of description, an MME is taken as an example of the core network equipment for illustration below. The embodiment of the disclosure is not limited to this.

Optionally, the relay terminal device may transmit the bearer setup request to the core network equipment by transmitting an RRC message to the access network equipment. Specifically, the relay terminal device may transmit an RRC message to the access network equipment, the RRC message carrying the bearer setup request. After receiving the RRC message, the access network equipment may transmit, for example, application layer protocol signaling to the core network equipment, to request the core network equipment to set up an EPS bearer for the remote terminal device. The embodiment of the disclosure is not limited to this.

Optionally, the relay terminal device may also transmit a NAS message to the core network equipment, the NAS message carrying the bearer setup request. The embodiment of the disclosure is not limited to this.

At S220, after receiving the bearer setup request, the core network equipment may set up an EPS bearer for the remote terminal device together with the access network equipment according to the bearer setup request, where the EPS bearer includes a cellular data transmission channel between the access network equipment and the relay terminal device and a D2D data transmission channel between the relay terminal device and the remote terminal device.

Optionally, the EPS bearer may also include a data transmission channel between the core network equipment and the access network equipment and a data transmission channel between the core network equipment and a P-GW. Optionally, the data transmission channel between the core network equipment and the access network equipment and the data transmission channel between the core network equipment and the P-GW may be collectively referred to as GPRS Tunnelling Protocol (GTP) tunnels. The embodiment of the disclosure is not limited to this.

Optionally, if the EPS bearer is a default bearer for the remote terminal device, the core network equipment may further authenticate the remote terminal device, for example, perform identity authentication or security authentication, before setting up the EPS bearer. The embodiment of the disclosure is not limited to this.

Optionally, the core network equipment may transmit the information of the remote terminal device to the P-GW, such that the P-GW sets up a GTP tunnel for the remote terminal device according to the information of the remote terminal device. Optionally, the core network equipment may also receive configuration information of the GTP tunnel sent by the P-GW, for example, a Tunnel Endpoint Identifier (TEID) allocated to the remote terminal device. The embodiment of the disclosure is not limited to this.

Optionally, the core network equipment may also transmit application layer protocol signaling to the access network equipment, where the application layer protocol signaling may carry the terminal device identifier of the remote terminal device, such that the access network equipment sets up a radio bearer for the remote terminal device according to the application layer protocol signaling. The radio bearer for the remote terminal device may include the data transmission channel between the access network equipment and the relay terminal device and the data transmission channel between the relay terminal device and the remote terminal device. Optionally, the application layer protocol signaling may be specifically an initial context setup request, a Radio Access Bearer (RAB) setup request, or the like. The embodiment of the disclosure is not limited to this.

At S230, the access network equipment transmits a reconfiguration message to the relay terminal device, the reconfiguration message carrying configuration information of the EPS bearer set up for the remote terminal device.

Optionally, the reconfiguration message may be specifically an RRC connection reconfiguration message, and the configuration information of the EPS bearer may include configuration information of a radio bearer set up by the access network equipment for the remote terminal device. For example, the configuration information of the radio bearer may include at least one of: configuration information of a user-plane peer layer between the access network equipment and the relay terminal device, configuration information of a user-plane peer layer between the relay terminal device and the remote terminal device, or configuration information of a user-plane peer layer between the access network equipment and the remote terminal device. The embodiment of the disclosure is not limited to this.

Optionally, in the embodiment of the disclosure, the relay terminal device may relay data transmitted between the remote terminal device and the network equipment through a layer other than the IP layer. For example, the relay terminal device may adopt a Layer-1 relay or Layer-2 relay manner. The Layer-1 relay may be specifically a physical layer relay, and the Layer-2 relay may be specifically a Media Access Control (MAC) layer relay, a Radio Link Control (RLC) layer relay, or a Packet Data Convergence Protocol (PDCP) layer relay. The relay transmission manner adopted by the relay terminal device is not limited in the embodiment of the disclosure.

Figure 3:
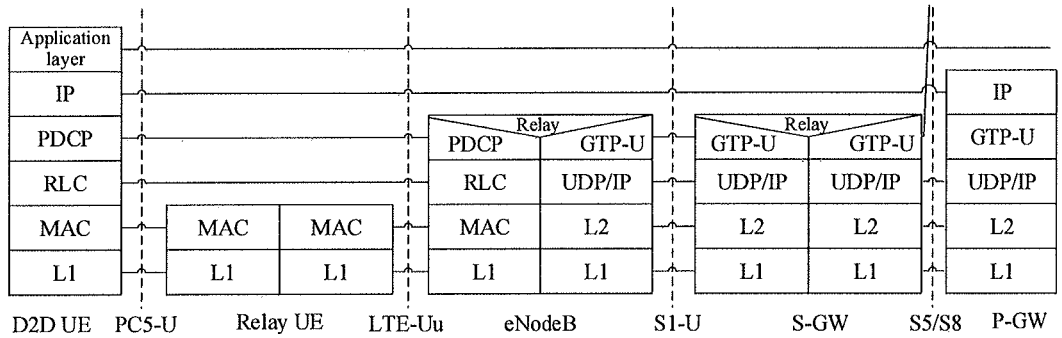
FIG. 3 is a schematic diagram illustrating an example of a user-plane protocol stack for relay communication in each device according to an embodiment of the disclosure.

Optionally, the relay terminal device may adopt the Layer-1 relay manner. In this case, a user-plane protocol stack of the relay terminal device may only include a physical layer. In an example of the user-plane protocol stack shown in FIG. 3, the physical layer of the relay terminal device is a peer layer of a physical layer of the remote terminal device and is a peer layer of a physical layer of the network equipment, and higher layers (for example, Layer 2 and Layer 3) of the network equipment and the remote terminal device are peer layers. The embodiment of the disclosure is not limited to this. In this case, optionally, when data are required to be transmitted to each other, the network equipment or the remote terminal device may encapsulate the data into a MAC PDU carrying identification information of the remote terminal device, process the MAC PDU through the physical layer to generate a physical layer data frame, and transmit the physical layer data frame to the relay terminal device through the physical layer. After receiving the physical layer data frame sent by the remote terminal device or the network equipment, the relay terminal device may process and forward the data carried in the received physical layer data frame at the physical layer, and does not identify the remote terminal device corresponding to the physical layer data frame. Correspondingly, the network equipment or the remote terminal device that receives the data sent by the relay terminal device through the physical layer may identify the remote terminal device corresponding to the data at a higher layer (for example, Layer 2 or Layer 3). The embodiment of the disclosure is not limited to this.

In this case, optionally, the configuration information of the radio bearer may include the configuration information of the user-plane peer layer between the access network equipment and the relay terminal device, that is, configuration information of a cellular communication interface between the relay terminal device and the access network equipment. The configuration information of the cellular communication interface may include configuration information of a Layer 1 (that is, physical layer) used by the access network equipment and the relay terminal device to perform relay transmission with each other. For ease of description, the configuration information may be referred to as first configuration information of the physical layer. The embodiment of the disclosure is not limited to this. Optionally, the first configuration information of the physical layer includes at least one of: information of a first transmission resource for relay transmission, a relay-specific RNTI, a correspondence between a data volume interval for relay transmission and a PUCCH resource, or a correspondence between the data volume interval for relay transmission and a preamble. Alternatively, the first configuration information of the physical layer may further include other information for relay transmission. The embodiment of the disclosure is not limited to this.

Specifically, the first transmission resource for relay transmission may be specifically used for transmitting relay data between the relay terminal device and the access network equipment. Therefore, when the relay terminal device receives a physical layer data frame transmitted by the access network equipment using the first transmission resource, or, when the access network equipment receives a physical layer data frame transmitted by the relay terminal device using the first transmission resource, it can be determined, according to the first transmission resource occupied by the physical layer data frame, that the physical layer data frame carries relay data. The embodiment of the disclosure is not limited to this.

The relay-specific RNTI can be used for identifying the relay data. Specifically, the access network equipment may scramble, by using the relay-specific RNTI, a PDCCH for scheduling downlink data transmission of the remote terminal device, such that the relay terminal device can determine, through addressing by using the relay-specific RNTI, that the received physical layer data frame carries relay data. The embodiment of the disclosure is not limited to this.

When the relay terminal device needs to relay data of the remote terminal device to the network equipment, optionally, the relay terminal device may request an uplink grant from the network equipment. As an optional embodiment, the relay terminal device may transmit a buffer status report to the network equipment, the buffer status report carrying information of the data buffer size of the relay terminal device, such that the network equipment can allocate an uplink transmission resource to the relay terminal device according to the buffer status report.

As another optional embodiment, the first configuration information of the physical layer may also include a correspondence between a data volume interval for relay transmission and a PUCCH resource. Therefore, the relay terminal device may determine, according to the correspondence between the data volume interval and the PUCCH resource, a PUCCH resource corresponding to a data volume to be relayed, and adopt the corresponding PUCCH resource to transmit a scheduling request to the network equipment. In this case, the network equipment may determine, according to the PUCCH resource occupied by the scheduling request, a to-be-transmitted data volume interval of the relay terminal device, and allocate an uplink transmission resource accordingly. The embodiment of the disclosure is not limited to this.

As another optional embodiment, the first configuration information of the physical layer may also include a correspondence between a data volume interval for relay transmission and a preamble. In this case, the relay terminal device may request an uplink grant by transmitting a preamble to the network equipment. Specifically, the relay terminal device may determine, according to the correspondence between the data volume interval and the preamble, a preamble corresponding to a data volume to be relayed, and transmit the corresponding preamble to the network equipment. In this case, the network equipment may determine, according to the corresponding preamble, a to-be-transmitted data volume interval of the relay terminal device, and allocate an uplink transmission resource accordingly. The embodiment of the disclosure is not limited to this.

Optionally, the first configuration information of the physical layer may further include the configuration information of the user-plane peer layer between the relay terminal device and the remote terminal device, that is, configuration information of a D2D communication interface between the relay terminal device and the remote terminal device. The configuration information of the D2D communication interface may include configuration information of a Layer 1 (that is, physical layer) used by the relay terminal device and the remote terminal device to perform relay transmission with each other. For ease of description, the configuration information may be referred to as second configuration information of the physical layer. The embodiment of the disclosure is not limited to this. Optionally, the second configuration information of the physical layer may include information of a second transmission resource for relay transmission, where the second transmission resource is used for relay transmission between the relay terminal device and the remote terminal device. Therefore, when the relay terminal device receives a physical layer data frame transmitted by the remote terminal device using the second transmission resource, or when the remote terminal device receives a physical layer data frame transmitted by the relay terminal device using the second transmission resource, it can be determined, according to the second transmission resource occupied by the physical layer data frame, that the physical layer data frame carries relay data. The embodiment of the disclosure is not limited to this.

Optionally, the second configuration information of the physical layer may also include other information. The embodiment of the disclosure is not limited to this.

Optionally, the configuration information of the radio bearer may further include the configuration information of the user-plane peer layer between the access network equipment and the remote terminal device. For example, the configuration information of the radio bearer further includes at least one of configuration information of a MAC layer, configuration information of an RLC layer, or configuration information of a PDCP layer. In this case, the relay terminal device may also transmit, to the remote terminal device, the configuration information of the user-plane peer layer between the access network equipment and the remote terminal device. After receiving the configuration information, the remote terminal device may configure at least one of a MAC layer, an RLC layer, or a PDCP layer. The embodiment of the disclosure is not limited to this.

Figure 4:
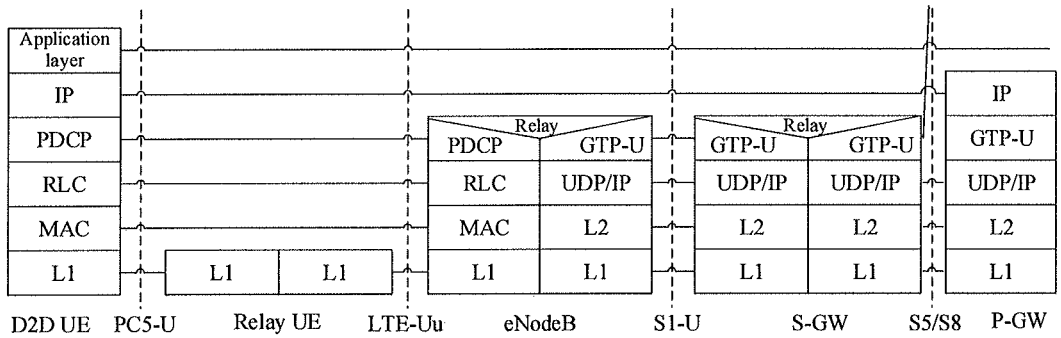
FIG. 4 is a schematic diagram illustrating an example of another user-plane protocol stack for relay communication in each device according to an embodiment of the disclosure.

Optionally, the relay terminal device may also adopt a Layer-2 relay manner, for example, a MAC layer relay, an RLC layer relay, or a PDCP layer relay manner. In this case, a user-plane protocol stack of the relay terminal device may only include at least one of a physical layer and a Layer 2. In an example of the user-plane protocol stack shown in FIG. 4, the relay terminal device adopts a MAC layer relay manner. In this case, the physical layer of the relay terminal device is a peer layer of a physical layer of the remote terminal device and is a peer layer of a physical layer of the network equipment, a MAC layer of the relay terminal device is a peer layer of a MAC layer of the network equipment and is a peer layer of a MAC layer of the remote terminal device, and RLC layers, PDCP layers, and higher layers of the network equipment and the remote terminal device are peer layers. The embodiment of the disclosure is not limited to this. In this case, optionally, the relay terminal device may identify the remote terminal device according to identification information of the remote terminal device, where the identification information of the remote terminal device may include a terminal device identifier of the remote terminal device or a Layer-2 identifier. Optionally, when needing to transmit data to each other, the network equipment or the remote terminal device may encapsulate the data into a Layer-2 PDU, that is, a PDU generated after Layer-2 and Layer-1 encapsulation, where the Layer-2 PDU may carry the identification information of the remote terminal device. Alternatively, when the access network equipment transmits relay data to the relay terminal device, the network equipment may schedule the Layer-2 PDU through a PDCCH scrambled by using an RNTI of the remote terminal device. When receiving the Layer-2 PDU sent by the remote terminal device or the network equipment, the relay terminal device may process the received Layer-2 PDU on the Layer 2. For example, the relay terminal device identifies the remote terminal device corresponding to the received Layer-2 PDU according to the identification information of the remote terminal device at the Layer 2; or encapsulates, according to the identification information of the remote terminal device, the Layer-2 PDU sent to a receiving end device at the Layer 2. The embodiment of the disclosure is not limited to this.

In this case, optionally, the configuration information of the user-plane peer layer between the access network equipment and the relay terminal device may specifically include configuration information of a Layer 1 and a Layer 2 used by the access network equipment and the relay terminal device to perform relay transmission with each other. Corresponding to the user-plane protocol stack, the configuration information of the Layer 2 may include configuration information of a MAC layer, or further include configuration information of an RLC layer, or further include configuration information of an RLC layer and a PDCP layer. For ease of understanding, the configuration information of the Layer 1 and the Layer 2 may be referred to as first configuration information of the physical layer and first configuration information of the Layer 2 respectively. The embodiment of the disclosure is not limited to this.

Optionally, reference can be made to the above description for the first configuration information of the physical layer, and the details are not repeatedly described herein for brevity. As another optional embodiment, the first configuration information of the physical layer may further include a target preamble allocated by the network equipment to the remote terminal device. In this case, when the relay terminal device needs to relay data of the remote terminal device to the access network equipment, the relay terminal device may initiate an uplink grant request to the access network equipment by using the target preamble; and the access network equipment may determine the remote terminal device corresponding to the uplink grant request according to the target preamble, and allocate an uplink transmission resource to the data of the remote terminal device. The embodiment of the disclosure is not limited to this.

As another optional embodiment, the first configuration information of the physical layer may also include an RNTI allocated by the network equipment to the remote terminal device. In this case, when the access network equipment needs to transmit data of the remote terminal device, the access network equipment may scramble, by using the RNTI allocated to the remote terminal device, a PDCCH for scheduling downlink data transmission of the remote terminal device, such that the relay terminal device can determine the remote terminal device corresponding to the received Layer-2 PDU through addressing by using the RNTI. The embodiment of the disclosure is not limited to this.

Optionally, the first configuration information of the Layer 2 may include at least one of: a relay-specific LCID, a Layer-2 identifier allocated to the remote terminal device, or an RNTI allocated to the remote terminal device. Alternatively, the first configuration information of the Layer 2 may also include other information for relay transmission. The embodiment of the disclosure is not limited to this.

Specifically, the relay-specific LCID can be used for identifying relay transmission. In this case, when the access network equipment receives the Layer-2 PDU sent by the relay terminal device or the relay terminal device receives the Layer-2 PDU sent by the access network equipment, it can be determined, according to the relay-specific LCID carried in the Layer-2 PDU, that the Layer-2 PDU carries relay data. The embodiment of the disclosure is not limited to this.

The Layer-2 identifier may be an identifier encapsulated and identified at the Layer 2, and the Layer-2 identifier can be used for identifying the remote terminal device in relay transmission. Optionally, the length of the Layer-2 identifier may be less than the length of the terminal device, and therefore, the signaling overhead can be reduced by carrying the Layer-2 identifier in the PDU as compared with the situation that the terminal device identifier is carried in the Layer-2 PDU. The embodiment of the disclosure is not limited to this. Optionally, the Layer-2 identifier may be set at a MAC layer, an RLC layer, or a PDCP layer. Alternatively, the Layer 2 of the remote terminal device and the access network equipment may be further added with an adaptation layer, where the adaptation layer may be placed at any position between the MAC layer and the PDCP layer, and the Layer-2 identifier may be set at the adaptation layer. The embodiment of the disclosure is not limited to this.

Optionally, the configuration information of the user-plane peer layer between the relay terminal device and the remote terminal device may include configuration information of the physical layer and the Layer 2 used by the relay terminal device and the remote terminal device to perform relay transmission with each other. For ease of description, the configuration information of the physical layer and the Layer 2 may be referred to as second configuration information of the physical layer and second configuration information of the Layer 2 respectively. The embodiment of the disclosure is not limited to this. Specifically, reference can be made to the above description for the second configuration information of the physical layer, and the details are not repeatedly described herein for brevity. The second configuration information of the Layer 2 may include the Layer-2 identifier of the remote terminal device or other information. The embodiment of the disclosure is not limited to this.

Optionally, the configuration information of the user-plane peer layer between the access network equipment and the remote terminal device may include at least one of configuration information of an RLC layer and configuration information of a PDCP layer. In this case, the relay terminal device may transmit, to the remote terminal device, indication information that indicates at least one of the configuration information of the RLC layer and the configuration information of the PDCP layer, such that the remote terminal device performs corresponding configurations. The embodiment of the disclosure is not limited to this.

Optionally, if the bearer setup request is further configured to request the setup of a PDN connection for the remote terminal device, the access network equipment and the core network equipment may set up a PDN connection for the remote terminal device, and transmit configuration information of the PDN connection, for example, an IP address, to the relay terminal device. In this case, optionally, the relay terminal device may also transmit the configuration information of the PDN connection to the remote terminal device. The embodiment of the disclosure is not limited to this.

Optionally, the relay terminal device may perform corresponding configurations according to the configuration information of the EPS bearer, and after completion of the configurations, transmit a reconfiguration complete message (for example, an RRC connection reconfiguration complete message) and an uplink information transfer message to the access network equipment. The embodiment of the disclosure is not limited to this.

In view of the above, according to the method for relay transmission provided by the embodiment of the disclosure, the relay terminal device transmits a bearer setup request to the core network equipment, the bearer setup request being configured to request the setup of an EPS bearer for the remote terminal device; and the core network equipment and the access network equipment set up an EPS bearer for the remote terminal device according to the bearer setup request, where the EPS bearer includes a cellular data transmission channel between the access network equipment and the relay terminal device and a D2D data transmission channel between the relay terminal device and the remote terminal device. Therefore, the relay terminal device can adopt the EPS bearer to relay data transmitted between the remote terminal device and the access network equipment, such that the relay terminal device can relay in different manners and does not need to perform NET traversal, thus reducing the data processing complexity of relay transmission.

The embodiments of the disclosure will be described in detail below with reference to specific examples. It should be noted that, these examples are merely provided for persons skilled in the art to better understand the embodiments of the disclosure, and are not intended to limit the scope of the embodiments of the disclosure.

For ease of description, it is assumed in the following examples that a PDN connection and a bearer have been set up for the remote terminal device in a cellular network, the remote terminal device is specifically a remote UE, the relay terminal device is specifically a relay UE, and a network equipment is specifically an eNB. The embodiment of the disclosure is not limited to this.

Figure 5:
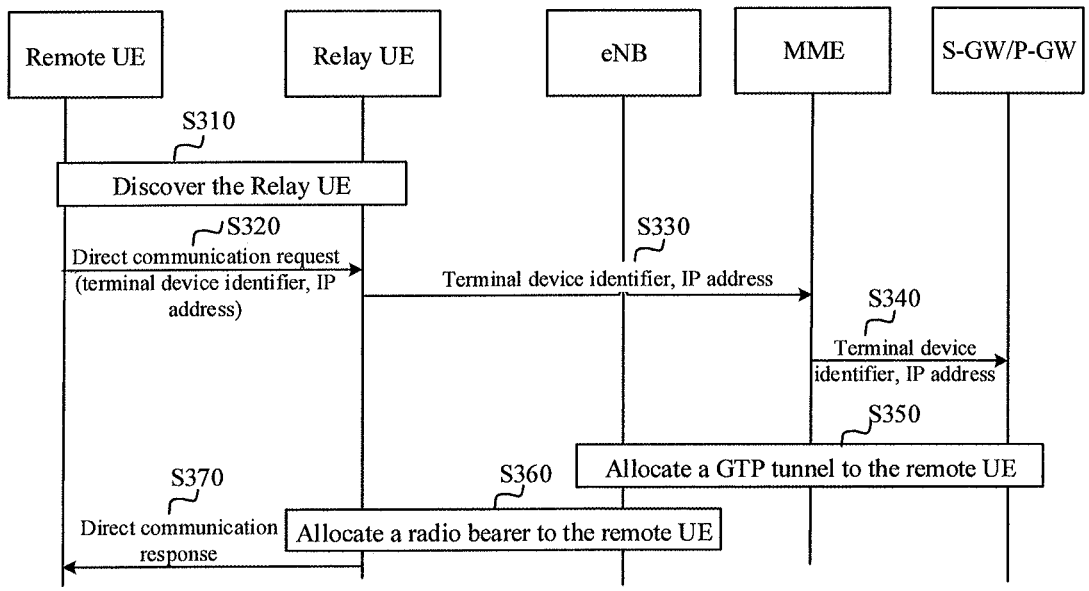
FIG. 5 is a schematic flow chart of another method for relay transmission provided by an embodiment of the disclosure.

FIG. 5 exemplifies a bearer setup method 300 provided by an embodiment of the disclosure. In the method 300, it is assumed that the remote terminal device has attached to a cellular network (for example, an Evolved Universal Terrestrial Radio Access Network (E-UTRAN)), or the remote terminal device has set up a PDN connection with the cellular network. The embodiment of the disclosure is not limited to this.

At S310, the remote terminal device discovers the relay terminal device and resides in the relay terminal device.

At S320, the remote terminal device transmits a direct communication request to the relay terminal device, where the direct communication request may carry a terminal device identifier of the remote terminal device and an IP address of a PDN connection for the remote terminal device.

The direct communication request may be specifically used for setting up a D2D communication link between the remote terminal device and the relay terminal device, for example, a PC5 connection between the remote terminal device and the relay terminal device. The embodiment of the disclosure is not limited to this.

At S330, after receiving the direct communication request sent by the remote terminal device, the relay terminal device reports, through the eNB, the terminal device identifier of the remote terminal device and the IP address of the PDN connection to the MME.

At S340, the MME may store the terminal device identifier and the IP address, and transmit the terminal device identifier and the IP address to the P-GW (or S-GW).

At S350, the MME and the P-GW allocate, to the remote terminal device, a GTP tunnel of an S1-U interface, for example, a TEID.

At S360, the eNB allocates a radio bearer between the relay terminal device and the eNB to the remote terminal device.

Optionally, the configuration information of the radio bearer may include configuration information of a physical layer or include configuration information of a physical layer and configuration information of a MAC layer. Optionally, the configuration information of the MAC layer may include a Layer-2 identifier allocated to the remote terminal device. Alternatively, the eNB may also transmit configuration of an RLC layer and/or configuration of a PDCP layer of the remote terminal device to the relay terminal device. The embodiment of the disclosure is not limited to this.

At S330, the relay terminal device transmits a direct communication response to the remote terminal device.

Optionally, the direct communication response may carry the Layer-2 identifier and/or an RRC container, where the RRC container may encapsulate the configuration of the RLC layer and/or the configuration of the PDCP layer. Correspondingly, after receiving the direct communication response, the remote terminal device may configure a corresponding RLC layer and/or PDCP layer according to the RRC container in the direct communication response. The embodiment of the disclosure is not limited to this.

Figure 6:
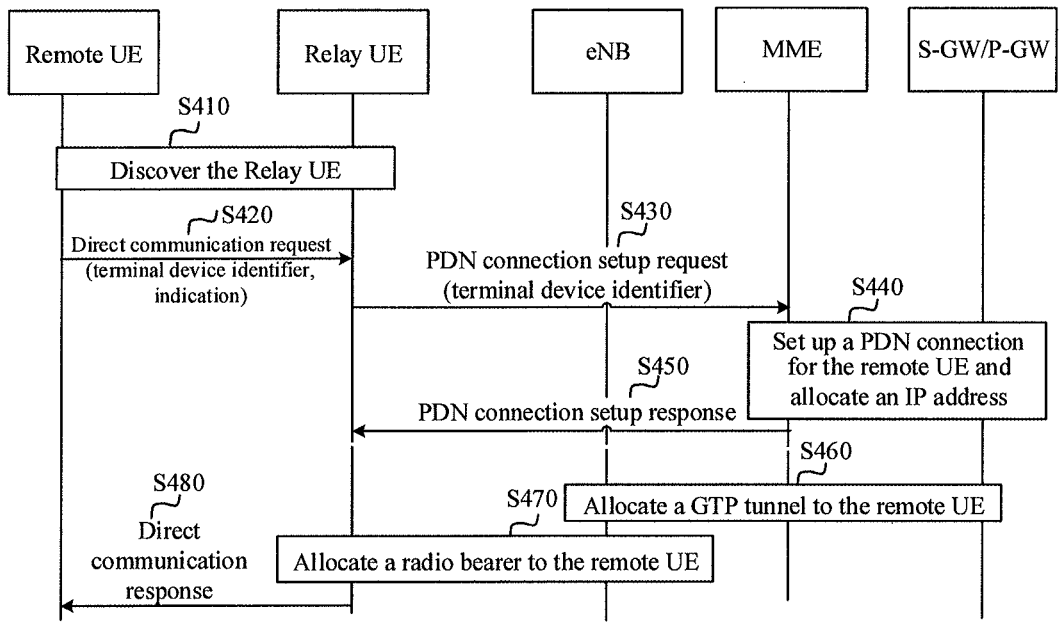
FIG. 6 is a schematic flow chart of another method for relay transmission provided by an embodiment of the disclosure.

FIG. 6 exemplifies another bearer setup method 400 provided by an embodiment of the disclosure. In the method 400, it is assumed that the remote terminal device has not set up a PDN connection.

At S410, the remote terminal device discovers the relay terminal device and resides in the relay terminal device.

At S420, the remote terminal device transmits a direct communication request to the relay terminal device, where the direct communication request may carry a terminal device identifier of the remote terminal device and indication information for requesting the setup of a PDN connection.

In this case, the direct communication request may be configured to request the setup of a PC5 connection between the remote terminal device and the relay terminal device, and may also be configured to request the setup of a PDN connection between the remote terminal device and a cellular network.

At S430, the relay terminal device may transmit a PDN connection setup request to the MME through the eNB according to the direct communication request, to request the setup of a PDN connection for the remote terminal device. Optionally, the PDN connection setup request may carry the terminal device identifier of the remote terminal device.

At S440, the core network equipment (MME or S-GW/P-GW) creates a PDN connection for the remote terminal device and allocates an IP address to the remote terminal device.

At S450, the MME transmits a PDN connection setup response to the relay terminal device through the eNB, the PDN connection setup response carrying configuration information of the PDN connection, for example, an IP address.

At S460, the MME allocates, to the remote terminal device, a GTP tunnel of an S1-U, for example, a TEID.

At S430, the eNB allocates a radio bearer between the relay terminal device and the eNB to the remote terminal device.

Optionally, the configuration information of the radio bearer may include configuration information of a physical layer or include configuration information of a physical layer and configuration information of a Layer 2. The embodiment of the disclosure is not limited to this.

At S440, the relay terminal device transmits a direct communication response to the remote terminal device.

Optionally, the direct communication response may carry a Layer-2 identifier and/or an RRC container, and may also carry information of the PDN connection, for example, an IP address. The embodiment of the disclosure is not limited to this.

It should be noted that, the examples in FIG. 3 to FIG. 6 are provided for persons skilled in the art to better understand the embodiments of the disclosure, and are not intended to limit the scope of the embodiments of the disclosure. It is apparent to persons skilled in the art that equivalent modifications or changes can be made according to the examples in FIG. 3 to FIG. 6, and these modifications or changes also fall within the scope of the embodiments of the disclosure.

It should be understood that, the serial number of each process does not indicate the order of performing the process. The order of performing each process should be determined by its function and internal logic, and shall not limit the implementation of the embodiments of the disclosure.

The method for relay transmission according to the embodiments of the disclosure is described in detail above with reference to FIG. 1 to FIG. 6, and an apparatus for relay transmission according to embodiments of the disclosure will be described in detail below with reference to FIG. 7 to FIG. 12.

Figure 7:
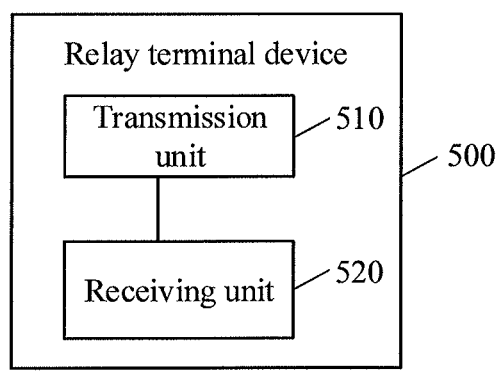
FIG. 7 is a schematic block diagram of a relay terminal device provided by an embodiment of the disclosure.

FIG. 7 shows a relay terminal device 500 provided by an embodiment of the disclosure. As shown in FIG. 7, the relay terminal device 500 includes:

a transmission unit 510, configured to transmit a bearer setup request to a core network equipment, the bearer setup request being configured to request the setup of an EPS bearer for a remote terminal device; and a receiving unit 520, configured to receive a reconfiguration message sent by an access network equipment, the reconfiguration message carrying configuration information of the EPS bearer set up for the remote terminal device, where the EPS bearer includes a cellular data transmission channel between the access network equipment and the relay terminal device and a D2D data transmission channel between the relay terminal device and the remote terminal device.

Optionally, the bearer setup request carries a terminal device identifier of the remote terminal device.

Optionally, the configuration information of the EPS bearer includes configuration information of a cellular communication interface between the relay terminal device and the access network equipment and configuration information of a D2D communication interface between the relay terminal device and the remote terminal device.

Optionally, the configuration information of the cellular communication interface is specifically first configuration information of a physical layer, and the configuration information of the D2D communication interface is specifically second configuration information of the physical layer; or the configuration information of the cellular communication interface is specifically first configuration information of a physical layer and first configuration information of a Layer 2, and the configuration information of the D2D communication interface is specifically at least one of second configuration information of the physical layer and second configuration information of the Layer 2.

Optionally, the first configuration information of the physical layer includes at least one of: information of a first transmission resource for relay transmission on the cellular communication interface, a relay-specific RNTI, a correspondence between a data volume interval for relay transmission and a PUCCH resource, and a correspondence between the data volume interval for relay transmission and a preamble, where the relay-specific RNTI is used by the access network equipment to scramble a PDCCH for scheduling downlink data transmission of the remote terminal device.

Optionally, the second configuration information of the physical layer includes: information of a second transmission resource for relay transmission on the D2D communication interface.

Optionally, the first configuration information of the Layer 2 includes at least one of: a relay-specific LCID and a Layer-2 identifier allocated to the remote terminal device, the relay-specific LCID being used for identifying relay transmission.

Optionally, the second configuration information of the Layer 2 includes: the Layer-2 identifier allocated to the remote terminal device.

Optionally, the configuration information of the EPS bearer further includes configuration information of a user-plane peer layer between the access network equipment and the remote terminal device.

Correspondingly, the transmission unit 510 is further configured to transmit, to the remote terminal device, the configuration information of the user-plane peer layer between the access network equipment and the remote terminal device.

Optionally, the receiving unit 520 is further configured to receive a connection setup request from the remote terminal device before the transmission unit 510 transmits a bearer setup request to the core network equipment, the connection setup request being configured to request the setup of a D2D communication link between the relay terminal device and the remote terminal device.

Correspondingly, the transmission unit 510 is specifically configured to transmit a bearer setup request to the core network equipment according to the connection setup request received by the receiving unit 520.

Optionally, the transmission unit 510 is specifically configured to transmit a NAS message to the core network equipment, the NAS message responding to the bearer setup request.

Optionally, the bearer setup request carries a terminal device identifier of the remote terminal device; and correspondingly, the EPS bearer is set up by the core network equipment in a manner of transmitting application layer protocol signaling to the access network equipment, the application layer protocol signaling carrying the terminal device identifier of the remote terminal device.

Optionally, the transmission unit 510 is specifically configured to transmit an RRC message to the access network equipment, the RRC message carrying the bearer setup request, such that the access network equipment transmits, to the core network equipment according to the RRC message, application layer protocol signaling for requesting the setup of a bearer for the remote terminal device.

Optionally, the bearer setup request is further configured to request the setup of a PDN connection for the remote terminal device. In this case, the reconfiguration message further carries configuration information of the PDN connection set up for the remote terminal device. The transmission unit 510 is further configured to transmit the configuration information of the PDN connection to the remote terminal device.

In an optional example, the relay terminal device 500 may correspond to the relay terminal device in the above method embodiments, and may be configured to perform each step and/or process corresponding to the relay terminal device in the above method embodiments. The details are not repeatedly described herein for brevity.

Figure 8:
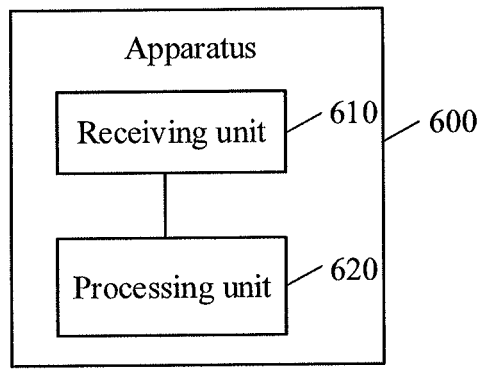
FIG. 8 is a schematic block diagram of an apparatus for relay transmission provided by an embodiment of the disclosure.

FIG. 8 shows an apparatus for relay transmission 600 provided by an embodiment of the disclosure. As shown in FIG. 8, the apparatus 600 includes:

a receiving unit 610, configured to receive a bearer setup request sent by a relay terminal device, the bearer setup request being configured to request the setup of an EPS bearer for a remote terminal device; and a processing unit 620, configured to set up an EPS bearer for the remote terminal device according to the bearer setup request received by the receiving unit 610, where the EPS bearer includes a cellular data transmission channel between the access network equipment and the relay terminal device and a D2D data transmission channel between the relay terminal device and the remote terminal device.

Optionally, the bearer setup request carries a terminal device identifier of the remote terminal device.

Optionally, the receiving unit 610 is specifically configured to receive a NAS message sent by the relay terminal device, the NAS message responding to the bearer setup request.

Correspondingly, the apparatus 600 further includes: a transmission unit, where the processing unit 620 is specifically configured to transmit application layer protocol signaling to the access network equipment through the transmission unit, the application layer protocol signaling carrying the terminal device identifier of the remote terminal device.

Optionally, the receiving unit 610 is specifically configured to receive application layer protocol signaling sent by the access network equipment, where the application layer protocol signaling is sent by the access network equipment according to an RRC message sent by the relay terminal device, and the RRC message carries the bearer setup request.

In an optional example, the apparatus 600 may correspond to the core network equipment in the above method embodiments, and may be configured to perform each step and/or process corresponding to the core network equipment in the above method embodiments. The details are not repeatedly described herein for brevity.

Figure 9:
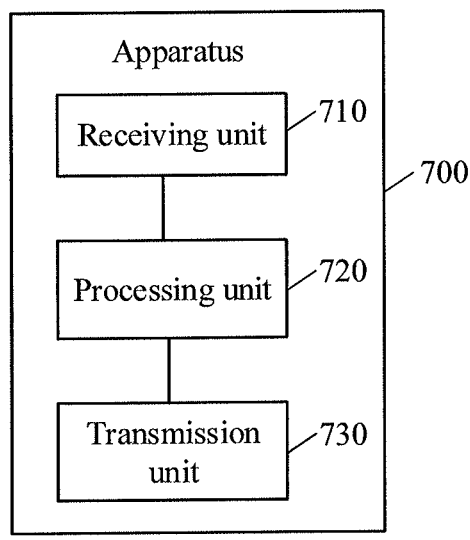
FIG. 9 is a schematic block diagram of another apparatus for relay transmission provided by an embodiment of the disclosure.

FIG. 9 shows another apparatus for relay transmission 700 provided by an embodiment of the disclosure. As shown in FIG. 9, the apparatus 700 includes:

a receiving unit 710, configured to receive a bearer setup request for requesting the setup of an EPS bearer for a remote terminal device;

a processing unit 720, configured to set up an EPS bearer for the remote terminal device according to the bearer setup request received by the receiving unit 710, where the EPS bearer includes a cellular data transmission channel between the access network equipment and a relay terminal device and a D2D data transmission channel between the relay terminal device and the remote terminal device; and a transmission unit 730, configured to transmit a reconfiguration message to the relay terminal device, the reconfiguration message carrying configuration information of the EPS bearer set up by the processing unit 720.

Optionally, the configuration information of the EPS bearer includes configuration information of a cellular communication interface between the relay terminal device and the access network equipment and configuration information of a D2D communication interface between the relay terminal device and the remote terminal device.

Optionally, the configuration information of the cellular communication interface is specifically first configuration information of a physical layer, and the configuration information of the D2D communication interface is specifically second configuration information of the physical layer; or the configuration information of the cellular communication interface is specifically first configuration information of a physical layer and first configuration information of a Layer 2, and the configuration information of the D2D communication interface is specifically at least one of second configuration information of the physical layer and second configuration information of the Layer 2.

Optionally, the first configuration information of the physical layer includes at least one of: information of a first transmission resource for relay transmission on the cellular communication interface, a relay-specific RNTI, a correspondence between a data volume interval for relay transmission and a PUCCH resource, and a correspondence between the data volume interval for relay transmission and a preamble, where the relay-specific RNTI is used by the access network equipment to scramble a PDCCH for scheduling downlink data transmission of the remote terminal device.

Optionally, the second configuration information of the physical layer includes: information of a second transmission resource for relay transmission on the D2D communication interface.

Optionally, the first configuration information of the Layer 2 includes at least one of: a relay-specific LCID and a Layer-2 identifier allocated to the remote terminal device, the relay-specific LCID being used for identifying relay transmission.

Optionally, the second configuration information of the Layer 2 includes: the Layer-2 identifier allocated to the remote terminal device.

Optionally, the configuration information of the EPS bearer further includes configuration information of a user-plane peer layer between the access network equipment and the remote terminal device.

Optionally, the receiving unit 710 is specifically configured to receive an RRC message sent by the relay terminal device, the RRC message carrying the bearer setup request.

Correspondingly, the processing unit 720 is specifically configured to transmit, through the transmission unit 730 to the core network equipment according to the RRC message, application layer protocol signaling for requesting the setup of a bearer for the remote terminal device.

Optionally, the receiving unit 710 is specifically configured to receive application layer protocol signaling sent by the core network equipment, the application layer protocol signaling carrying the bearer setup request.

Optionally, the bearer setup request carries a terminal device identifier of the remote terminal device.

Optionally, the bearer setup request is further configured to request the setup of a PDN connection for the remote terminal device. In this case, the processing unit 720 is further configured to set up a PDN connection for the remote terminal device according to the bearer setup request. Correspondingly, the transmission unit 730 is further configured to transmit configuration information of the PDN connection to the relay terminal device.

In an optional example, the apparatus 700 may correspond to the access network equipment in the above method embodiments, and may be configured to perform each step and/or process corresponding to the access network equipment in the above method embodiments. The details are not repeatedly described herein for brevity.

It should be understood that, the device 500, the apparatus 600, and the apparatus 700 are embodied in the form of functional units. The term "unit" here may refer to an Application Specific Integrated Circuit (ASIC), an electronic circuit, a processor configured to execute one or more software or firmware programs (for example, a shared processor, dedicated processor, or group processor), a storage device, a combined logic circuit, and/or any other suitable component that supports the described function.

Figure 10:
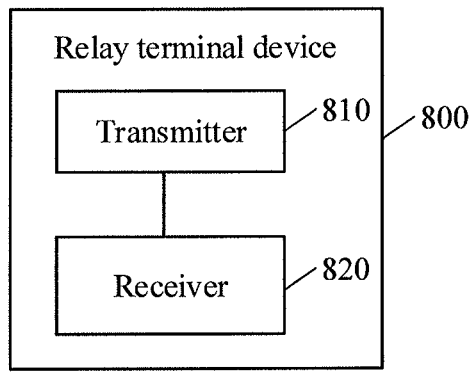
FIG. 10 is a schematic block diagram of another relay terminal device provided by an embodiment of the disclosure.

FIG. 10 shows a relay terminal device 800 provided by an embodiment of the disclosure. As shown in FIG. 10, the relay terminal device 800 includes:

a transmitter 810, configured to transmit a bearer setup request to a core network equipment, the bearer setup request being configured to request the setup of an EPS bearer for a remote terminal device; and a receiver 820, configured to receive a reconfiguration message sent by an access network equipment, the reconfiguration message carrying configuration information of the EPS bearer set up for the remote terminal device, where the EPS bearer includes a cellular data transmission channel between the access network equipment and the relay terminal device and a D2D data transmission channel between the relay terminal device and the remote terminal device.

Optionally, the bearer setup request carries a terminal device identifier of the remote terminal device.

Optionally, the configuration information of the EPS bearer includes configuration information of a cellular communication interface between the relay terminal device and the access network equipment and configuration information of a D2D communication interface between the relay terminal device and the remote terminal device.

Optionally, the configuration information of the cellular communication interface is specifically first configuration information of a physical layer, and the configuration information of the D2D communication interface is specifically second configuration information of the physical layer; or the configuration information of the cellular communication interface is specifically first configuration information of a physical layer and first configuration information of a Layer 2, and the configuration information of the D2D communication interface is specifically at least one of second configuration information of the physical layer and second configuration information of the Layer 2.

Optionally, the first configuration information of the physical layer includes at least one of: information of a first transmission resource for relay transmission on the cellular communication interface, a relay-specific RNTI, a correspondence between a data volume interval for relay transmission and a PUCCH resource, and a correspondence between the data volume interval for relay transmission and a preamble, where the relay-specific RNTI is used by the access network equipment to scramble a PDCCH for scheduling downlink data transmission of the remote terminal device.

Optionally, the second configuration information of the physical layer includes: information of a second transmission resource for relay transmission on the D2D communication interface.

Optionally, the first configuration information of the Layer 2 includes at least one of: a relay-specific LCID and a Layer-2 identifier allocated to the remote terminal device, the relay-specific LCID being used for identifying relay transmission.

Optionally, the second configuration information of the Layer 2 includes: the Layer-2 identifier allocated to the remote terminal device.

Optionally, the configuration information of the EPS bearer further includes configuration information of a user-plane peer layer between the access network equipment and the remote terminal device.

Correspondingly, the transmiter 810 is further configured to transmit, to the remote terminal device, the configuration information of the user-plane peer layer between the access network equipment and the remote terminal device.

Optionally, the receiver 820 is further configured to receive a connection setup request from the remote terminal device before the transmitter 810 transmits a bearer setup request to the core network equipment, the connection setup request being configured to request the setup of a D2D communication link between the relay terminal device and the remote terminal device.

Correspondingly, the transmiter 810 is specifically configured to transmit a bearer setup request to the core network equipment according to the connection setup request received by the receiver 820.

Optionally, the transmiter 810 is specifically configured to transmit a NAS message to the core network equipment, the NAS message responding to the bearer setup request.

Optionally, the bearer setup request carries a terminal device identifier of the remote terminal device; and correspondingly, the EPS bearer is set up by the core network equipment in a manner of transmitting application layer protocol signaling to the access network equipment, the application layer protocol signaling carrying the terminal device identifier of the remote terminal device.

Optionally, the transmiter 810 is specifically configured to transmit an RRC message to the access network equipment, the RRC message carrying the bearer setup request, such that the access network equipment transmits, to the core network equipment according to the RRC message, application layer protocol signaling for requesting the setup of a bearer for the remote terminal device.

Optionally, the bearer setup request is further configured to request the setup of a PDN connection for the remote terminal device. In this case, the reconfiguration message further carries configuration information of the PDN connection set up for the remote terminal device. The transmitter 810 is further configured to transmit the configuration information of the PDN connection to the remote terminal device.

In an optional example, the relay terminal device 800 may correspond to the relay terminal device in the above method embodiments, and may be configured to perform each step and/or process corresponding to the relay terminal device in the above method embodiments. Optionally, the device 800 may further include a storage device and a processor. The storage device may include a Read-Only Memory (ROM) and a Random Access Memory (RAM), and provide instructions and data to the processor. A part of the storage device may further include a non-volatile RAM. For example, the storage device may also store information about the device type. The processor may be configured to execute the instructions stored in the storage device, and when executing the instructions stored in the storage device, the processor performs each step and/or process in the above method embodiments.

Figure 11:
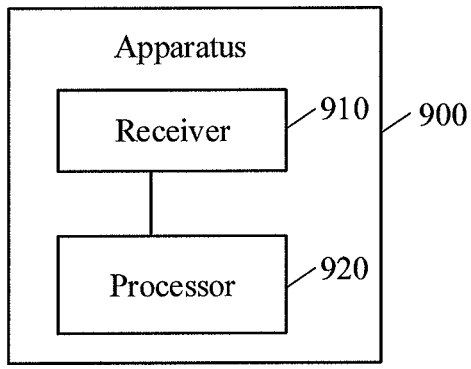
FIG. 11 is a schematic block diagram of another apparatus for relay transmission provided by an embodiment of the disclosure.

FIG. 11 shows an apparatus for relay transmission 900 provided by an embodiment of the disclosure. As shown in FIG. 11, the apparatus 900 includes:

a receiver 910, configured to receive a bearer setup request sent by a relay terminal device, the bearer setup request being configured to request the setup of an EPS bearer for a remote terminal device; and a processor 920, configured to set up an EPS bearer for the remote terminal device according to the bearer setup request received by the receiver 910, where the EPS bearer includes a cellular data transmission channel between the access network equipment and the relay terminal device and a D2D data transmission channel between the relay terminal device and the remote terminal device.

Optionally, the bearer setup request carries a terminal device identifier of the remote terminal device.

Optionally, the receiver 910 is specifically configured to receive a NAS message sent by the relay terminal device, the NAS message responding to the bearer setup request.

Correspondingly, the apparatus 900 further includes: a transmiter, where the processor 920 is specifically configured to transmit application layer protocol signaling to the access network equipment through the transmiter, the application layer protocol signaling carrying the terminal device identifier of the remote terminal device.

Optionally, the receiver 910 is specifically configured to receive application layer protocol signaling sent by the access network equipment, where the application layer protocol signaling is sent by the access network equipment according to an RRC message sent by the relay terminal device, and the RRC message carries the bearer setup request.

In an optional example, the apparatus 900 may correspond to the core network equipment in the above method embodiments, and may be configured to perform each step and/or process corresponding to the core network equipment in the above method embodiments. Optionally, the apparatus 900 may further include a storage device. The storage device may include a ROM and a RAM, and provide instructions and data to the processor. A part of the storage device may further include a non-volatile RAM. For example, the storage device may also store information about the device type. The processor may be configured to execute the instructions stored in the storage device, and when executing the instructions stored in the storage device, the processor performs each step and/or process in the above method embodiments.

Figure 12:
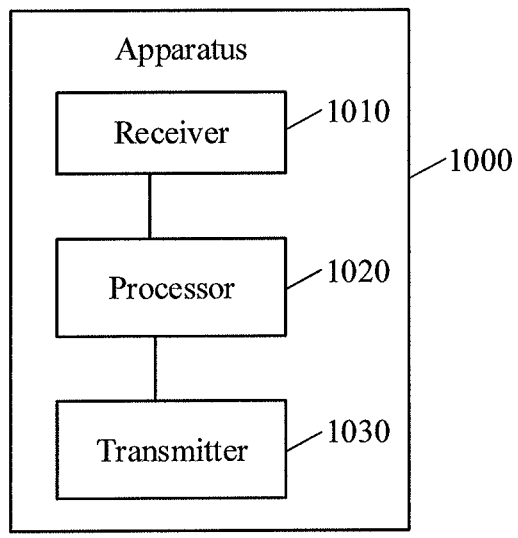
FIG. 12 is a schematic block diagram of another apparatus for relay transmission provided by an embodiment of the disclosure.

FIG. 12 shows another apparatus for relay transmission 1000 provided by an embodiment of the disclosure. As shown in FIG. 12, the apparatus 1000 includes:

a receiver 1010, configured to receive a bearer setup request for requesting the setup of an EPS bearer for a remote terminal device;

a processor 1020, configured to set up an EPS bearer for the remote terminal device according to the bearer setup request received by the receiver 1010, where the EPS bearer includes a cellular data transmission channel between the access network equipment and a relay terminal device and a D2D data transmission channel between the relay terminal device and the remote terminal device; and a transmitter 1030, configured to transmit a reconfiguration message to the relay terminal device, the reconfiguration message carrying configuration information of the EPS bearer set up by the processor 1020.

Optionally, the configuration information of the EPS bearer includes configuration information of a cellular communication interface between the relay terminal device and the access network equipment and configuration information of a D2D communication interface between the relay terminal device and the remote terminal device.

Optionally, the configuration information of the cellular communication interface is specifically first configuration information of a physical layer, and the configuration information of the D2D communication interface is specifically second configuration information of the physical layer; or the configuration information of the cellular communication interface is specifically first configuration information of a physical layer and first configuration information of a Layer 2, and the configuration information of the D2D communication interface is specifically at least one of second configuration information of the physical layer and second configuration information of the Layer 2.

Optionally, the first configuration information of the physical layer includes at least one of: information of a first transmission resource for relay transmission on the cellular communication interface, a relay-specific RNTI, a correspondence between a data volume interval for relay transmission and a PUCCH resource, and a correspondence between the data volume interval for relay transmission and a preamble, where the relay-specific RNTI is used by the access network equipment to scramble a PDCCH for scheduling downlink data transmission of the remote terminal device.

Optionally, the second configuration information of the physical layer includes: information of a second transmission resource for relay transmission on the D2D communication interface.

Optionally, the first configuration information of the Layer 2 includes at least one of: a relay-specific LCID and a Layer-2 identifier allocated to the remote terminal device, the relay-specific LCID being used for identifying relay transmission.

Optionally, the second configuration information of the Layer 2 includes: the Layer-2 identifier allocated to the remote terminal device.

Optionally, the configuration information of the EPS bearer further includes configuration information of a user-plane peer layer between the access network equipment and the remote terminal device.

Optionally, the receiver 1010 is specifically configured to receive an RRC message sent by the relay terminal device, the RRC message carrying the bearer setup request.

Correspondingly, the processor 1020 is specifically configured to transmit, through the transmitter 1030 to the core network equipment according to the RRC message, application layer protocol signaling for requesting the setup of a bearer for the remote terminal device.

Optionally, the receiver 1010 is specifically configured to receive application layer protocol signaling sent by the core network equipment, the application layer protocol signaling carrying the bearer setup request.

Optionally, the bearer setup request carries a terminal device identifier of the remote terminal device.

Optionally, the bearer setup request is further configured to request the setup of a PDN connection for the remote terminal device. In this case, the processor 1020 is further configured to set up a PDN connection for the remote terminal device according to the bearer setup request. Correspondingly, the transmitter 1030 is further configured to transmit configuration information of the PDN connection to the relay terminal device.

In an optional example, the apparatus 1000 may correspond to the access network equipment in the above method embodiments, and may be configured to perform each step and/or process corresponding to the access network equipment in the above method embodiments. Optionally, the apparatus 1000 may further include a storage device. The storage device may include a ROM and a RAM, and provide instructions and data to the processor. A part of the storage device may further include a non-volatile RAM. For example, the storage device may also store information about the device type. The processor may be configured to execute the instructions stored in the storage device, and when executing the instructions stored in the storage device, the processor performs each step and/or process in the above method embodiments.

It should be understood that, in the embodiments of the disclosure, the processor may be a Central Processing Unit (CPU), and may also be a general processor, a Digital Signal Processor (DSP), an ASIC, a Field Programmable Gate Array (FPGA), or a programmable logic device, a discrete gate, a transistor logic device, a discrete hardware component, and the like. The general processor may be a microprocessor, or the processor may also be any conventional processor.

During the implementation, the steps of each method may be performed through an integrated logic circuit of hardware in a processor or through instructions in the form of software. The steps of each method disclosed by the embodiments of the disclosure can be directly performed by a hardware processor, or by a combination of hardware in a processor and a software module. The software module may be positioned in a storage medium which is mature in the art, such as a RAM, a flash memory, a ROM, a programmable ROM, an electrically erasable programmable memory, or a register. The storage medium is located in the storage device. The processor executes the instructions in the storage device, and performs the steps in each method together with hardware in the processor. The details are not repeatedly described herein for brevity.

It should be understood that, for brevity, the differences between the embodiments are highlighted in the description of the embodiments of the disclosure, and reference can be made to each other for the identical or similar parts.

Persons of ordinary skill in the art may realize that, the steps of each method and the units described in the embodiments of the disclosure can be implemented with electronic hardware, computer software, or the combination thereof. In order to clearly describe the interchangeability between the hardware and the software, steps and compositions of each embodiment have been generally described according to functions in the foregoing descriptions. Whether these functions are implemented in hardware or software depends on specific applications of the technical solutions and design constraints. Persons of ordinary skill in the art may use different methods to implement the described functions for each specific application, but such implementation should not be considered to be beyond the scope of the disclosure.

Persons skilled in the art can clearly understand that, for convenience and brevity of description, reference can be made to corresponding processes in the foregoing method embodiments for specific working processes of the above-described systems, apparatuses, and units. Details are not described herein again.

In several embodiments provided herein, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In other respects, the intercoupling or direct coupling or communication connection shown or discussed may be indirect coupling or communication connection through some interfaces, apparatuses, or units; or may be implemented in electrical, mechanical, or other forms.

The units described as separate parts may or may not be physically separate. Parts displayed as units may or may not be physical units, which may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit. The foregoing integrated unit can be implemented either in the form of hardware or in the form of software functional units.

The integrated unit, if implemented in the form of a software functional unit and sold or used as a stand-alone product, may be stored in a computer-readable storage medium. Based on this understanding, the technical solution of the disclosure essentially, or a part contributing to the prior art, or all or a part of the technical solution may be embodied in a form of a software product. The computer software product is stored in a storage medium, and includes several instructions to enable a computer device (which may be a personal computer, a server, or an access network equipment) to execute all or some steps of the method according to the embodiments of the disclosure. The foregoing storage medium includes: any medium that can store program code, such as a USB flash disk, a removable hard disk, a ROM, a RAM, a magnetic disk, or an optical disc.

The above merely describes specific embodiments of the disclosure, but the protection scope of the disclosure is not limited thereto. Any person skilled in the art can easily conceive equivalent modifications or replacements within the technical scope of the disclosure, and these modifications or replacements shall fall within the protection scope of the disclosure. Therefore, the protection scope of the disclosure should be subject to the protection scope of the claims.

The invention claimed is:

1. A method for relay transmission, comprising:
   transmitting, by a relay terminal device, a bearer setup request to a core network equipment, the bearer setup request being configured to request setup of an Evolved Packet System (EPS) bearer for a remote terminal device; and
   receiving, by the relay terminal device, a reconfiguration message sent by an access network equipment, the reconfiguration message carrying configuration information of the EPS bearer set up for the remote terminal device, wherein the EPS bearer comprises a cellular data transmission channel between the access network equipment and the relay terminal device and a Device-to-Device (D2D) data transmission channel between the relay terminal device and the remote terminal device, wherein the configuration information of the EPS bearer comprises configuration information of a cellular communication interface between the relay terminal device and the access network equipment and configuration information of a D2D communication interface between the relay terminal device and the remote terminal device;
   the configuration information of the cellular communication interface is specifically first configuration information of a physical layer, and the configuration information of the D2D communication interface is specifically second configuration information of the physical layer; or
   the configuration information of the cellular communication interface is specifically first configuration information of a physical layer and first configuration information of a Layer 2, and the configuration information of the D2D communication interface is specifically at least one of second configuration information of the physical layer or second configuration information of the Layer 2.

2. The method according to claim 1,
   wherein the first configuration information of the physical layer comprises at least one of: information of a first transmission resource for relay transmission on the cellular communication interface, a relay-specific Radio Network Temporary Identity (RNTI), a correspondence between a data volume interval for relay transmission and a Physical Uplink Control Channel (PUCCH) resource, or a correspondence between the data volume interval for relay transmission and a preamble, wherein the relay-specific RNTI is used by the access network equipment to scramble a Physical Downlink Control Channel (PDCCH) for scheduling downlink data transmission of the remote terminal device; and
   the second configuration information of the physical layer comprises: information of a second transmission resource for relay transmission on the D2D communication interface.

3. The method according to claim 2, wherein the first configuration information of the Layer 2 comprises at least one of: a relay-specific Logical Channel Identifier (LCID) or a Layer-2 identifier allocated to the remote terminal device, the relay-specific LCID being configured to identify relay transmission; and/or
   the second configuration information of the Layer 2 comprises: the Layer-2 identifier allocated for the remote terminal device.

4. The method according to claim 2, wherein the configuration information of the EPS bearer further comprises configuration information of a user-plane peer layer between the access network equipment and the remote terminal device; and
   the method further comprises:
   transmitting, to the remote terminal device, the configuration information of the user-plane peer layer between the access network equipment and the remote terminal device.

5. The method according to claim 1, before the transmitting, by the relay terminal device, the bearer setup request to the core network equipment, further comprising:
   receiving, by the relay terminal device, a connection setup request from the remote terminal device, the connection setup request being configured to request setup of a D2D communication link between the relay terminal device and the remote terminal device; and wherein the transmitting, by the relay terminal device, the bearer setup request to the core network equipment comprises:

transmitting, by the relay terminal device, the bearer setup request to the core network equipment according to the connection setup request.

6. The method according to claim 1, wherein the transmitting, by a relay terminal device, the bearer setup request to the core network equipment comprises:

transmitting, by the relay terminal device, a Non Access Stratum (NAS) message to the core network equipment, the NAS message responding to the bearer setup request.

7. The method according to claim 6, wherein the bearer setup request carries the terminal device identifier of the remote terminal device; and the EPS bearer is set up by the core network equipment transmitting application layer protocol signaling to the access network equipment, the application layer protocol signaling carrying the terminal device identifier of the remote terminal device.

8. The method according to claim 1, wherein the transmitting, by the relay terminal device, the bearer setup request to the core network equipment comprises:

transmitting, by the relay terminal device, a Radio Resource Control (RRC) message to the access network equipment, the RRC message carrying the bearer setup request, such that the access network equipment transmits, to the core network equipment according to the RRC message, application layer protocol signaling for requesting setup of a bearer for the remote terminal device.

9. The method according to claim 1, wherein the bearer setup request is further configured to request setup of a Packet Data Network (PDN) connection for the remote terminal device;

the reconfiguration message further carries configuration information of the PDN connection set up for the remote terminal device; and the method further comprises:

transmitting, by the relay terminal device, the configuration information of the PDN connection to the remote terminal device.

10. A relay terminal device, comprising:

a transmitter, configured to transmit a bearer setup request to a core network equipment, the bearer setup request being configured to request setup of an Evolved Packet System (EPS) bearer for a remote terminal device; and a receiver, configured to receive a reconfiguration message sent by an access network equipment, the reconfiguration message carrying configuration information of the EPS bearer set up for the remote terminal device, wherein the EPS bearer comprises a cellular data transmission channel between the access network equipment and the relay terminal device and a Device-to-Device (D2D) data transmission channel between the relay terminal device and the remote terminal device, wherein the configuration information of the EPS bearer comprises configuration information of a cellular communication interface between the relay terminal device and the access network equipment and configuration information of a D2D communication interface between the relay terminal device and the remote terminal device;

the configuration information of the cellular communication interface is specifically first configuration information of a physical layer, and the configuration information of the D2D communication interface is specifically second configuration information of the physical layer; or the configuration information of the cellular communication interface is specifically first configuration information of a physical layer and first configuration information of a Layer 2, and the configuration information of the D2D communication interface is specifically at least one of second configuration information of the physical layer or second configuration information of the Layer 2.

11. The relay terminal device according to claim 10, wherein the first configuration information of the physical layer comprises at least one of: information of a first transmission resource for relay transmission on the cellular communication interface, a relay-specific Radio Network Temporary Identity (RNTI), a correspondence between a data volume interval for relay transmission and a Physical Uplink Control Channel (PUCCH) resource, or a correspondence between the data volume interval for relay transmission and a preamble, wherein the relay-specific RNTI is used by the access network equipment to scramble a Physical Downlink Control Channel (PDCCH) for scheduling downlink data transmission of the remote terminal device; and the second configuration information of the physical layer comprises: information of a second transmission resource for relay transmission on the D2D communication interface.

12. The relay terminal device according to claim 10, wherein the first configuration information of the Layer 2 comprises at least one of: a relay-specific Logical Channel Identifier (LCID) or a Layer-2 identifier allocated to the remote terminal device, the relay-specific LCID being configured to identify relay transmission; and/or the second configuration information of the Layer 2 comprises: the Layer-2 identifier allocated to the remote terminal device.

13. The relay terminal device according to claim 10, wherein the configuration information of the EPS bearer further comprises configuration information of a user-plane peer layer between the access network equipment and the remote terminal device;

the transmitter is further configured to transmit, to the remote terminal device, the configuration information of the user-plane peer layer between the access network equipment and the remote terminal device.

14. The relay terminal device according to claim 10, wherein the receiver is further configured to receive a connection setup request from the remote terminal device before the transmitter transmits the bearer setup request to the core network equipment, the connection setup request being configured to request setup of a D2D communication link between the relay terminal device and the remote terminal device; and the transmitter is specifically configured to transmit a bearer setup request to the core network equipment according to the connection setup request received by the receiver.

15. The relay terminal device according to claim 10, wherein the transmitter is specifically configured to transmit a Non Access Stratum (NAS) message to the core network equipment, the NAS message responding to the bearer setup request.

16. The relay terminal device according to claim 15, wherein the bearer setup request carries a terminal device identifier of the remote terminal device; and the EPS bearer is set up by the core network equipment transmitting application layer protocol signaling to the access network equipment, the application layer protocol signaling carrying the terminal device identifier of the remote terminal device.

17. The relay terminal device according to claim 10, wherein the transmitter is specifically configured to transmit a Radio Resource Control (RRC) message to the access network equipment, the RRC message carrying the bearer setup request, such that the access network equipment transmits, to the core network equipment according to the RRC message, application layer protocol signaling for requesting setup of a bearer for the remote terminal device.

18. The relay terminal device according to claim 10, wherein the bearer setup request is further configured to request setup of a Packet Data Network (PDN) connection for the remote terminal device;

the reconfiguration message further carries configuration information of the PDN connection set up for the remote terminal device; and the transmitter is further configured to transmit the configuration information of the PDN connection to the remote terminal device.

19. An apparatus for relay transmission, comprising:

a receiver, configured to receive a bearer setup request for requesting setup of an Evolved Packet System (EPS) bearer for a remote terminal device;

a processor, configured to set up the EPS bearer for the remote terminal device according to the bearer setup request received by the receiver, wherein the EPS bearer comprises a cellular data transmission channel between the access network equipment and a relay terminal device and a Device-to-Device (D2D) data transmission channel between the relay terminal device and the remote terminal device; and a transmitter, configured to transmit a reconfiguration message to the relay terminal device, the reconfiguration message carrying configuration information of the EPS bearer set up by the processor;

wherein the EPS bearer comprises a cellular data transmission channel between the access network equipment and the relay terminal device and a Device-to-Device (D2D) data transmission channel between the relay terminal device and the remote terminal device, wherein the configuration information of the EPS bearer comprises configuration information of a cellular communication interface between the relay terminal device and the access network equipment and configuration information of a D2D communication interface between the relay terminal device and the remote terminal device;

the configuration information of the cellular communication interface is specifically first configuration information of a physical layer, and the configuration information of the D2D communication interface is specifically second configuration information of the physical layer; or the configuration information of the cellular communication interface is specifically first configuration information of a physical layer and first configuration information of a Layer 2, and the configuration information of the D2D communication interface is specifically at least one of second configuration information of the physical layer or second configuration information of the Layer 2.

* * * * *